United States Patent
Morrison

[19]

[11] Patent Number: 5,941,995
[45] Date of Patent: Aug. 24, 1999

[54] RELOADING STATE ANALYZER

[75] Inventor: Robert D. Morrison, Star, Id.

[73] Assignee: Hewlett-Packard Company, Palo Alto, Calif.

[21] Appl. No.: 08/859,514

[22] Filed: May 20, 1997

[51] Int. Cl.[6] .................................................. G06F 11/00
[52] U.S. Cl. ................................................ 714/39; 714/38
[58] Field of Search .............................. 395/183.15, 559,
395/183.14, 182.03, 375, 652; 364/900,
200; 714/39, 38

[56]                References Cited

U.S. PATENT DOCUMENTS

| | | | |
|---|---|---|---|
| 4,301,513 | 11/1981 | Haag et al. | 364/900 |
| 4,495,599 | 1/1985 | Haag et al. | 364/920.2 |
| 4,636,940 | 1/1987 | Goodwin, Jr. | 714/39 |
| 5,073,968 | 12/1991 | Morrison | 395/500 |
| 5,210,862 | 5/1993 | DeAngelis et al. | 395/575 |
| 5,438,353 | 8/1995 | Morrison | 347/250 |
| 5,471,008 | 11/1995 | Fujita et al. | 84/633 |
| 5,515,499 | 5/1996 | Allen et al. | 714/5 |
| 5,521,625 | 5/1996 | Morrison | 347/108 |
| 5,579,493 | 11/1996 | Kiuchi et al. | 713/320 |
| 5,652,886 | 7/1997 | Tulpule et al. | 713/2 |
| 5,748,878 | 5/1998 | Rees et al. | 714/38 |
| 5,826,068 | 10/1998 | Gates | 713/600 |

*Primary Examiner*—Joseph E. Palys
*Assistant Examiner*—Nguyen Xuan Nguyen

[57] ABSTRACT

A reloading state analyzer for allowing a tree of trigger event sequences to be tracked is presented. The reloading state analyzer provides an input interface for receiving and conditioning input state data. A configuration memory stores configuration structures containing multiple compare terms and associated actions. A tree of configuration structures may be downloaded to the configuration memory from a user interface. The reloading state analyzer compares a plurality of current compare terms with input state data. When the input state data matches one of the current compare terms, an action associated with the matching compare term is executed. The action may be a state collection control action, such as an arm, disarm, trigger, collect or stop collection action, or it may be a reload action. If the action associated with the matching compare term is a reload action, a new set of compare terms are retrieved from the configuration memory and become the current compare terms. The reloading state analyzer also provides a sophisticated mapping feature which allows collection of only those desired input data states into a state memory.

17 Claims, 9 Drawing Sheets

| ADDRESS | COMPARE0 | COMPARE1 | COMPARE2 | COMPARE3 | ACTION0 | ACTION1 | ACTION2 | ACTION3 | NEXT_ADDRESS0 | NEXT_ADDRESS1 | NEXT_ADDRESS2 | NEXTADDRESS3 |
|---|---|---|---|---|---|---|---|---|---|---|---|---|
| FFFF | COMPARE0 | COMPARE1 | COMPARE2 | COMPARE3 | ACTION0 | ACTION1 | ACTION2 | ACTION3 | NEXT_ADDRESS0 | NEXT_ADDRESS1 | NEXT_ADDRESS2 | NEXTADDRESS3 |
| FFFE | COMPARE0 | COMPARE1 | COMPARE2 | COMPARE3 | ACTION0 | ACTION1 | ACTION2 | ACTION3 | NEXT_ADDRESS0 | NEXT_ADDRESS1 | NEXT_ADDRESS2 | NEXTADDRESS3 |
| ... | ... | ... | ... | ... | ... | ... | ... | ... | ... | ... | ... | ... |
| 0001 | | | | | | | | | | | | |
| 0000 | COMPARE0 | COMPARE1 | COMPARE2 | COMPARE3 | ACTION0 | ACTION1 | ACTION2 | ACTION3 | NEXT_ADDRESS0 | NEXT_ADDRESS1 | NEXT_ADDRESS2 | NEXTADDRESS3 |

| ADDRESS | COMPARE TERMS | | | | ACTIONS | | | NEXT ADDRESSES | | | |
|---------|---|---|---|---|---|---|---|---|---|---|---|
| 0000 | A | B | C | X | RELOAD | TRIGGER | STOP | - | 0001 | 0004 | - |
| 0001 | D | E | F | X | TRIGGER | STOP | TRIGGER | - | 0002 | - | 0003 | - |
| 0002 | H | X | X | X | COLLECT | - | - | - | - | - | - | - |
| 0003 | I | X | X | X | COLLECT | - | - | - | - | - | - | - |
| 0004 | G | X | X | X | COLLECT | - | - | - | 0005 | - | - | - |
| 0005 | J | K | X | X | STOP | COLLECT | . . . | - | - | - | - | - |

*FIG. 9*

RELOADING STATE ANALYZER

FIELD OF THE INVENTION

The present invention relates generally to the field of logic state analyzers, and more particularly to a reloading state analyzer which allows a tree of possible expected triggering sequences to be followed using a reloading state mechanism.

BACKGROUND OF THE INVENTION

One of the most common development problems in embedded processor system design is the integration of firmware and hardware. A firmware development team will nearly always use some type of development aid such as a logic analyzer or a processor emulator to create working software on the system. The test instrument is used to track operation of the hardware while running the firmware. When an unexpected deviation from expected operation occurs, the instrument should provide information on the sequence of events leading up to the failure.

Two types of logic analyzers, called timing analyzers and state analyzers, are utilized to track down system failures. The timing analyzer is generally used in tracking down hardware problems, such as insufficient access time from a device or bus conflicts (e.g., a driver source driving a data bus at the wrong time). The state analyzer is used for finding incorrect firmware instruction programming of the embedded processor. A third tool, called an emulator, provides a variety of debugging techniques, but nearly always includes some form of a state analyzer to track instruction flow.

State analyzers capture the state of one or more buses during an access cycle defined by a control signal called a clock or a strobe. A "state" is simply any one of the $2^n$ logical patterns that n-many digital signals may experience. A sequence of addresses or a sequence of fetched instructions are examples of electrical activity describable as states in a microprocessing environment and that can be monitored by a state analyzer to record their "state flow". It is assumed that at some time during the access cycle, there is valid data that is sampled by the state analyzer. This data, called a state, can be stored in sequence by a user defined set of analyzer constraints that when met, can initiate some event in the analyzer, such as initiating storage of states. For example, if the state analyzer is monitoring an address bus of an embedded processor, the analyzer could detect when the address of an invalid instruction trap occurs, and begin collecting states for storage and later examination.

To monitor the ongoing sequence of states in a system under test, a state analyzer samples the electrical values of the signals of interest at times determined by one or more clock signals associated with the system under test. The sampled electrical values obtained are compared to thresholds of selected value and polarity to determine their logical values, each of which will be either true or false, one or zero. Each resulting collection of ones and zeros for a sample is a state in the ongoing sequence of states. It is also simply a binary value that may be stored in a memory. A series of such stored values is a record of the activity occurring in the system under test. Such a record is also called a "trace".

To store an indefinitely long trace would require a corresponding indefinitely large memory. This is impractical due to both the cost of huge memories and the cost in engineering or technician time required to sort through several hundred thousand stored states, or even a few tens of thousands, to find the data that is meaningful for the problem under investigation. Some method of qualifying what states will be stored is essential to reduce the amount of trace data stored to manageable proportions while ensuring that the information in the trace is most likely to be pertinent to the investigation at hand.

Accordingly, logic state analyzers are typically equipped with sufficient memory to store traces that range from a few hundred to a few thousand states. The memories may be used as a circular buffer. That is, the newest data to be stored is written in the memory location currently containing the oldest data. The size of the trace is then limited to the memory capacity of the state memory, with the trace reflecting the most recent collected state activity occurring up to the time when the newest state was collected.

The storage of state data into the memory halts subsequent to the detection of some specified condition in the incoming state data. That condition is called the "trigger condition", or simply the "trigger". If the collection and storage of state data occurs up until a trigger condition and halts immediately upon the detection of the trigger, the trace then represents the activity that preceded the trigger. This is called a "store-before" trigger. If the collection and storage of state data were instead to begin upon detection of the trigger, the trace would then represent the activity that occurred after the trigger. This is called a "store-after" trigger. Typically, the user specifies some number of additional storage operations that is less than the memory capacity, e.g., half that number of locations. This produces a "store-about" trigger. A "store-about" trigger produces a trace that records both what states led up to the trigger, as well as those that followed it.

There are two methods of controlling the volume of states collected. The most commonly used state analyzer method is to provide the trigger capability mentioned previously (i.e., store-before, store-after, and store-about trigger capability), and with it, trigger the collection of a relatively small number of states before or after the trigger. The second method, which can be used in combination with the first, is to provide a collection match, typically referred to as a "store qualifier", which if and only if met, will cause states to be stored. Any states not meeting the store qualifier are discarded. Thus only states meeting some predefined user criteria, such as addresses within the range of an interrupt service routine, will be collected. The specification of what will cause a trigger or a collection is referred to as the analyzer's "match configuration". In all commercially available state analyzers, a single match configuration must be specified prior to the collection of the states.

One of the ways to help ensure that the trace contains principally the data that is most likely to be pertinent to the investigation at hand is to allow the trigger to represent a condition more sophisticated than simply any occurrence of a specified state. A sequential trigger, for instance, produces a trigger only when a predefined sequence of states has already occurred previous to the trigger state. The user can use a sequential trigger to define a required state flow to occur before the trigger. For example, the trigger may be desired upon fetching an instruction from the first address in a complement routine, but only if that routine is called in the context of floating point division, and not for floating point subtraction, etc. Thus, sequential triggering allows the user to specify a trigger condition that is not simply a mere place on a flow chart, but is one that has historical criteria associated with it as well.

Sequential triggering is accomplished by equipping a logic state analyzer with a mechanism to allow the user to define a sequence of states to precede a designated trigger state and a sequence detection mechanism to issue an appropriate internal trigger signal upon detection of the trigger state subsequent to the satisfaction of the sequence.

Conventional prior art state analyzers, even those having sophisticated triggering sequence capability, however, require the user to know and define the sequence of events (or states) upon which to trigger. These prior art state analyzers are inefficient when the user does not know which of a plethora of state sequences is actually causing the problem. With conventional state analyzers, a significant quantity of engineering time may be spent in a trial-an-error method of trying to correctly set up the state analyzer to capture the states that reveal the cause of the problem. A difficult firmware bug can require many retries with different configurations before the right states are captured that pinpoint the faulty firmware code. This time is also proportional to the time required in getting the bug to appear. For example, if the bug takes thirty minutes to appear, and ten state analyzer configuration set-up retries are required, five engineering hours elapse before the cause of a single firmware bug is detected. This is clearly an inefficient process, and much of the blame can be laid on the state analyzer's inability to readily capture the faulty states.

SUMMARY OF THE INVENTION

The present invention solves the above problems by providing a remarkably efficient state analyzer that permits a user to specify a tree of possible tracking paths and actions that may occur. The state analyzer traverses the tree in real time according to what states actually occur. The state analyzer of the present invention obtains this flexibility by instantaneously reloading a plurality of match terms and actions at selectable times during state monitoring and data acquisition. The analyzer compares each incoming state to each of the plurality of match terms. If a match occurs, and depending on which match term was matched, the state analyzer either executes an action event or rapidly reloads the state analyzer with a new set of user definable match terms and associated actions. A large RAM holds many match term descriptions and trigger sequence configurations, and the occurrence of a match triggers the reloading of any one of millions of such descriptions contained in the RAM. With this analyzer, it is possible to describe a continuum of trigger sequence configurations, each with a different outcome. This allows the analyzer to be set up to branch to many different possible match configurations, depending on what actually happens during the data acquisition stage. With the present invention, it is no longer necessary to know the problem before trying to find it. One can set up the reloading state analyzer for a large variety of possible outcomes, and run the acquisition of states to determine which outcome occurred while simultaneously obtaining a trace corresponding to a match configuration set up for this particular outcome.

BRIEF DESCRIPTIONS OF THE DRAWINGS

The objects and advantages of the invention will become more apparent and more readily appreciated from the following detailed description of the presently preferred exemplary embodiment of the invention taken in conjunction with the accompanying drawings, of which.

DETAILED DESCRIPTION OF THE PRESENT INVENTION

Figure 1:
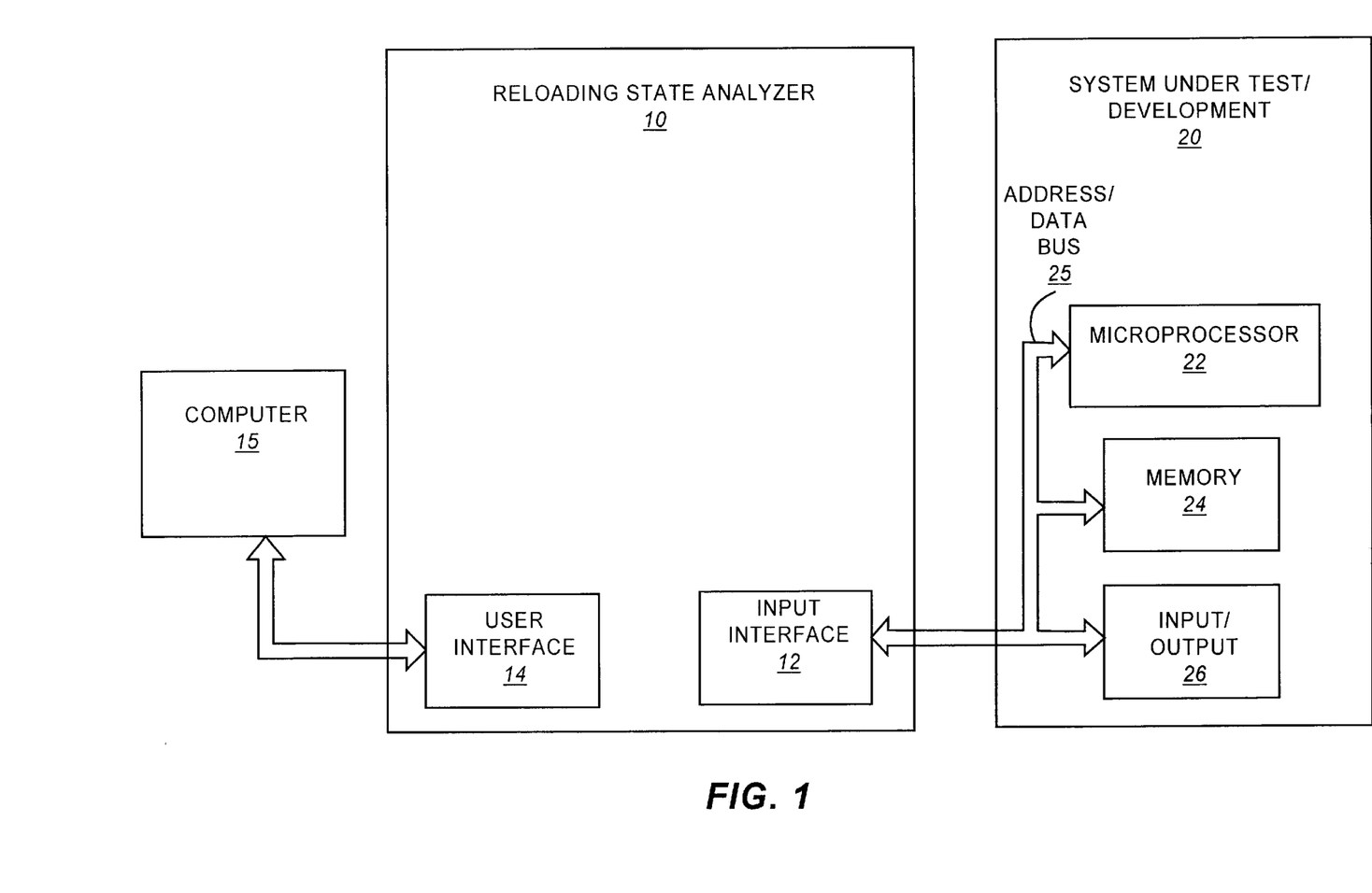
FIG. 1 is a block diagram of a development/test system in which the reloading state analyzer of the present invention might reside.

FIG. 1 is a block diagram of a development/test system under test/development 20 connected to a reloading state analyzer 10 in accordance with the present invention. As shown in FIG. 1, the system under test/development 20 may include a microprocessor 22, a memory 24, and an input/output device 26. In a typical testing configuration, the reloading state analyzer 10 is connected to the address/data bus 25 of the system under test/development 20. However, as will be appreciated by those skilled in the art, the connection may be made at any point where desired system state signals are made available external to the system under test/development 20. The reloading state analyzer 10 of the present invention provides an input interface 12 which receives state signals from the system under test/development 20 via the input/output device 26. As also shown in FIG. 1, the reloading state analyzer 10 provides a user interface 14 which may be connected to an external computer 15 to allow a user to specify a tree of multiple trigger sequence configurations (either manually via a keyboard or by downloading a triggering sequence tree file), and to observe and/or upload trace results.

Figure 2:
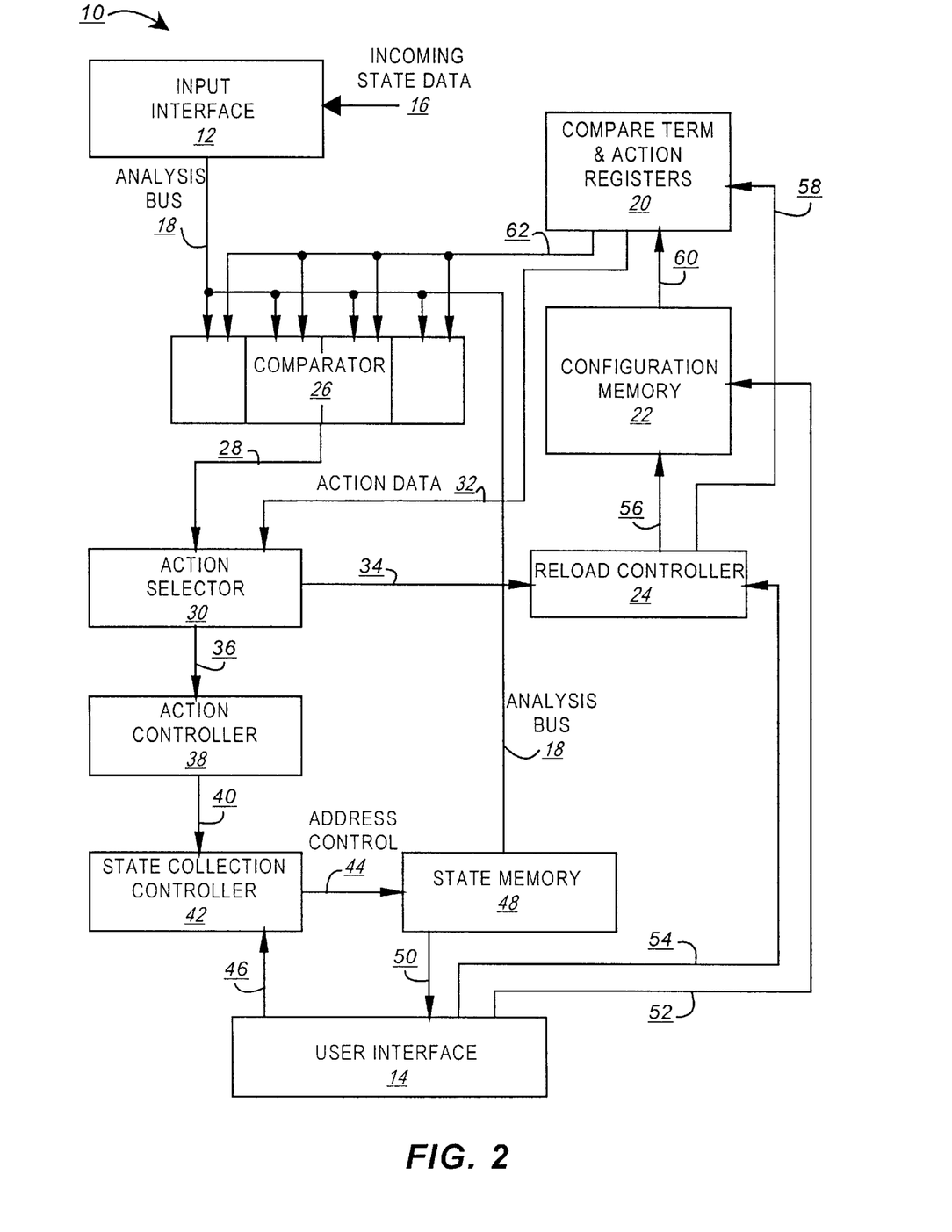
FIG. 2 is a block diagram of the reloading state analyzer of the present invention.

FIG. 2 is a block diagram of the reloading state analyzer 10 of the present invention. As shown in FIG. 2, the reloading state analyzer 10 includes the input interface 12 which receives incoming state data 16. In the system of FIG. 1, the incoming state data 16 comes from the address/data bus 25. In the configuration shown in FIG. 1, the data to be examined is the contents of the address/data bus 25 of the system under test/development 20, and therefore the input interface 12 is connected to the address/data bus 25 of the system. As will be appreciated by those skilled in the art, the present invention may be utilized to examine any number of signal types, including but not limited to other types of parallel data signals and serial data, such as MIDI data coming from a MIDI controller or debug data coming from a JTAG controller. The input interface 12 performs signal conditioning on the data, performs any required signal conversions, and outputs the converted conditioned data onto an analysis bus 18. The implementation of the input interface 12 will vary depending on the type of incoming state data 16. Accordingly, the input interface 12 in the configuration of FIG. 1 includes a serial-to-parallel latch, and the analysis bus 18 is a 16-bit (or appropriate n-bit word length) parallel bus.

As also shown in FIG. 2, the reloading state analyzer 10 includes a plurality of compare term/associated action registers 20. The compare term/associated action registers 20 hold current compare terms and associated actions which may be loaded from a configuration memory 22 or from the user interface 14, both under the control of a reload controller 24, as discussed hereinafter. The reloading state analyzer 10 includes a comparator 26 which is connected to receive each of the current compare terms held in the compare term/associated action registers 20 and the converted conditioned data from the analysis bus 18. For illustration purposes only, the reloading state analyzer 10 shown in FIG. 2 includes four comparison means in the comparator 26 and four compare term/associated action registers 20 which provides the ability of the reloading state analyzer 10 to compare four compare terms at a time. It will be appreciated by one skilled in the art, however, that any number of compare terms may be compared by providing the appropriate number of compare term/associated action registers 20 and corresponding comparison means in the comparator 26. The comparator 26 compares the converted conditioned data with each of the respective current compare terms held in the compare term/associated action registers 20, and generates a match signal 28 indicating which, if any, of the current compare terms match the converted conditioned data. An action selector 30 is connected to receive the match signal 28. A match condition on the match signal 28 initiates a two-step procedure. In the first step, the corresponding action of the current compare term from which the match signal was generated is retrieved from the compare term/associated action registers 20 and sent to the action selector 30 on an action data bus 32. The action in the preferred embodiment may include one of the following six pre-programmed actions: (1) arm the trigger; (2) disarm the trigger; (3) trigger; (4) collect; (5) stop collect; and (6) reload configuration (i.e., new compare terms and associated actions).

In the second step, the action is executed. If the action sent out on the action data bus 32 in the first step is an arm, disarm, trigger, collect, or stop collect, action, the action selector 30 sends control signals on an action control bus 36 to an action controller 38 which causes the action controller 38 to begin state collection (assuming the analyzer has already been triggered), via a state collection controller 40, as specified. An arm the trigger action causes the action selector 30 enable the trigger to occur if a triggering event occurs sometime in the future. A disarm action causes the action selector 30 to disallow triggering to occur even if a triggering event occurs sometime in the future. A trigger action permits the collection of states. A collect action permits the collection of states if a trigger has occurred. The collect action causes the collection of states (i.e., converted conditioned data from the analysis bus 18) into a state memory 48 to commence. A stop collect action prohibits the collection of states even if a trigger has occurred. The action controller 38 controls the state collection controller 42 via signals sent out on a state collection control bus 40. The state collection controller 42 allows or disallows state collection of state data present on the analysis bus 18 into the state memory 48 by sending control and address signals to the state memory 48 on an address/control bus 44.

If the action sent out on action data bus 32 is a reload action, however, a new set of compare terms and associated actions are retrieved from the configuration memory 22 and stored in the compare term/associated action registers 20, and a new configuration structure is pointed to in the configuration memory 22. Details of the configuration structure are discussed hereinafter. In the preferred embodiment, the action selector 30 determines the next address in the configuration memory 22 which contains the new configuration structure, which includes the new reload compare terms, associated actions, and next configuration structure addresses. The action selector 30 then signals the reload controller 24 on reload control bus 34 to load the new reload compare terms and associated actions into the compare term/associated action registers 20. The reload controller 24 causes the new compare terms and associated actions to be loaded into the compare term/associated action registers 20 from the configuration memory 22 via the new compare term bus 60 using control signals sent to the configuration memory 22 on the configuration memory address/control bus 56 and control signals sent to the compare term/associated action registers 20 on a compare term register control bus 58. The new compare terms and associated actions are then held in the compare term/associated action registers 20 and used as the current compare terms and associated actions on the next compare cycle.

A user interface 14 is also provided in the reloading state analyzer 10. The user interface 14 allows a user to download a trigger sequence configuration tree into the configuration memory 22. The triggering sequence tree may be downloaded via a download bus 52. The download is controlled by sending commands to the reload controller 24 via a user reload control bus 54. In the preferred embodiment, initial compare terms and associated actions may also be loaded into the compare term/associated action registers 20 from the user interface 14 by sending control and address signals on the user reload control bus 54 to the reload controller 24, which causes new compare terms and associated actions to be loaded from the configuration memory 22 into the compare term/associated action registers 20. The compare term/associated action registers 20 latch new compare terms and associated actions when the reload controller 24 sends a reload enable signal on the compare term register control bus 58. The user interface 14 also provides a user state collection control bus 46 which enables a user to cause the state collection controller 42 to upload the contents of the state memory 48 to the user interface 14 on a state bus 50.

As will be appreciated by those skilled in the art, the functionality of any or all of the functional blocks of the reloading state analyzer 10 may be combined into one or more functional circuit blocks. For example, the action selector 30 action controller 38, state collection controller 42 and reload controller 24 may be combined into one single circuit block.

Figure 3:
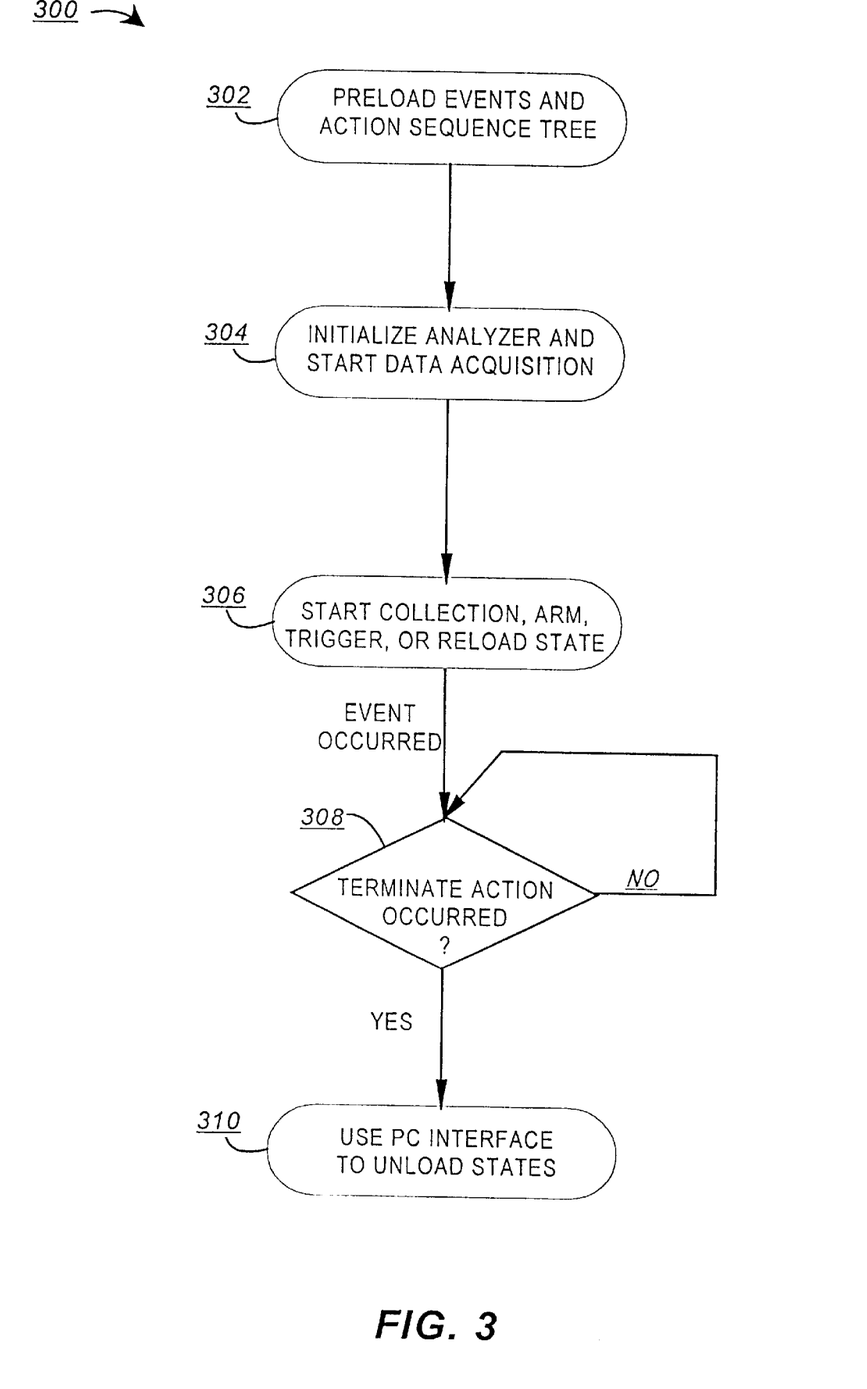
FIG. 3 is a flowchart illustrating the operation of the reloading state analyzer.

FIG. 3 is a flowchart of the method of operation of the reloading state analyzer 10 of the present invention. As shown in FIG. 3, the method, shown generally at 300, includes a first step of loading the configuration memory 22 with configuration structures including new compare terms, associated actions, and next configuration structure addresses corresponding to the desired collection sequence for each possible expected event sequence. The configuration memory 22 will preferably be implemented with a random access memory (RAM) having appropriate storage capacity to accommodate all of the configuration structures corresponding to all of the possible expected event sequences.

Figure 4:
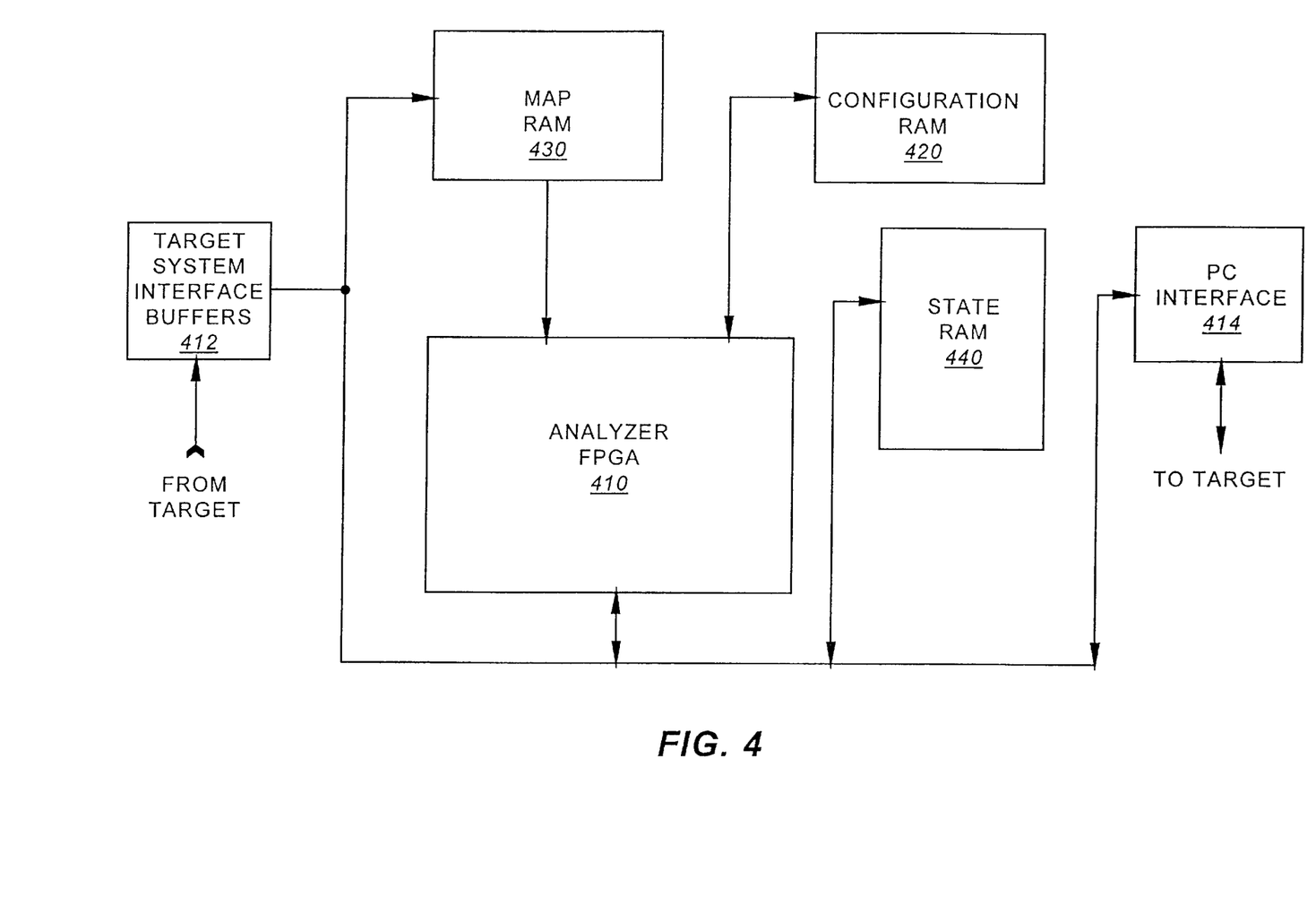
FIG. 4 is a block diagram of an implementation of a preferred embodiment of the reloading state analyzer of the present invention.

FIG. 4 illustrates a block diagram of a preferred embodiment of the reloading state analyzer 10 of the present invention. The reloading state analyzer circuitry shown in FIG. 4 at 400 is elegantly efficient, allowing for ease in manufacturing, testing, and development, and occupies only a minimal amount of space. The preferred embodiment of the reloading state analyzer 400 includes an FPGA (Field Programmable Gate Array) 410, a configuration RAM (random access memory) 420, a map RAM 430, a state RAM 440, interface buffers 412 to the target system under test/development, and interface buffers 414 to a PC (personal computer) bus interface ISA (Industry Standard Architecture) card. The FPGA 410 performs all of the functionality of the reloading state analyzer as discussed hereinafter. The configuration RAM 420 holds multiple trigger sequence configurations, comprising of compare terms and associated actions, accessible four configuration structures at a time. The map RAM 430 performs a mapping function to supplement the normal masked compare functions provided in the FPGA 410. The state RAM 440 stores collected 16-bit states. The PC interface buffers 414 and decodes ISA bus I/O functions for use by the FPGA 410. The target system interface buffers 412 protect the FPGA 410 from target system voltage problems and ESD (Electro Static Damage).

Figure 5:
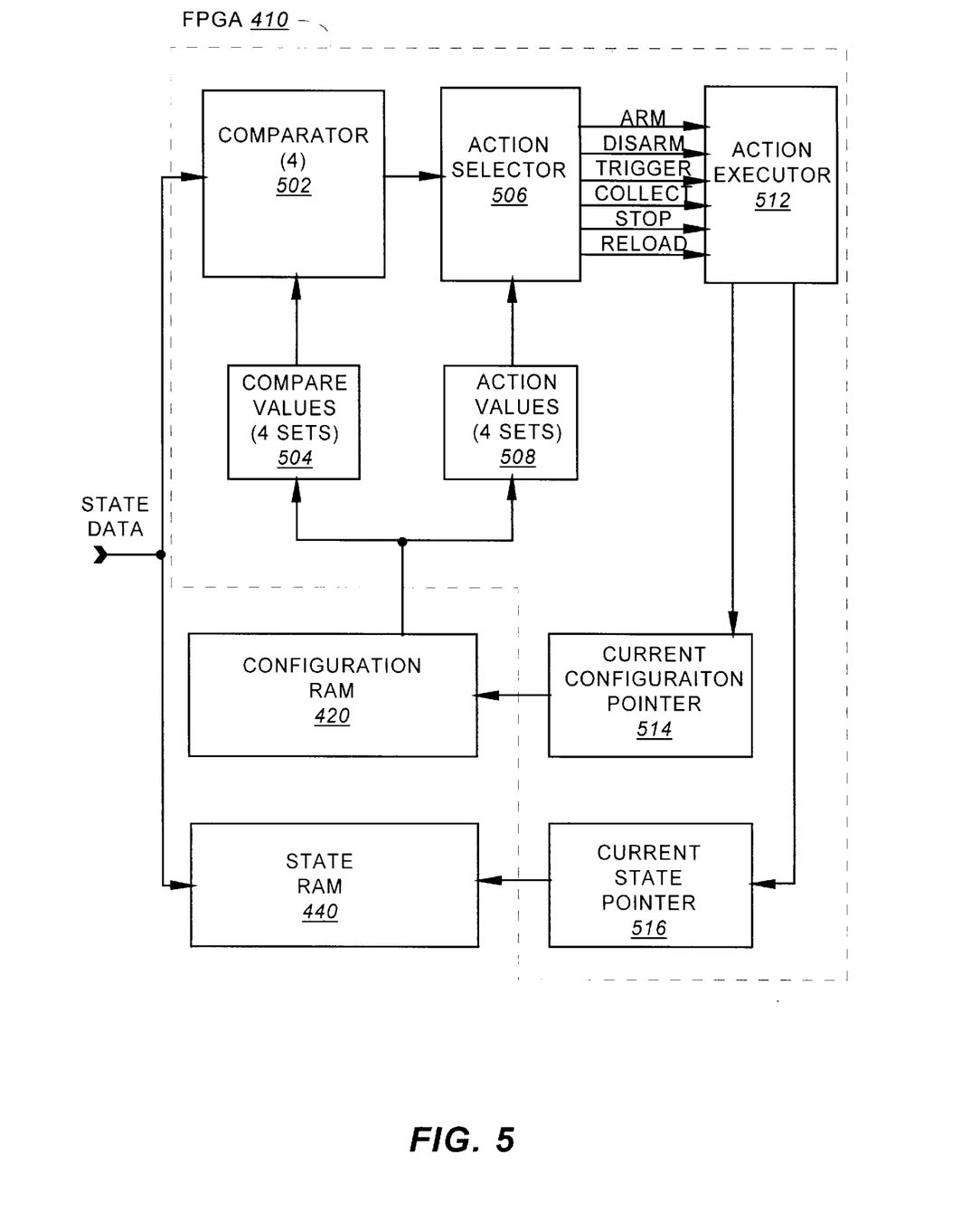
FIG. 5 is a high-level schematic diagram of a portion of the preferred embodiment reloading state analyzer of FIG. 4.

FIG. 5 is a high-level schematic diagram of a portion of the preferred embodiment reloading state analyzer of FIG. 4. The configuration RAM 420 and state RAM 440 are shown, as are the high-level details of the FPGA 410. As shown in FIG. 5, the logic implemented in the FPGA 410 includes four comparators 502 connected to receive the buffered target data from the interface buffers 412 and four sets of compare values 504. The comparators 502 compare the buffered target data to the compare values 504. The FPGA 410 also includes an action selector 506 which receives a match signal if the buffered data matches one of the compare terms 504. The action selector 506 decodes the match signal, determines which action to take from four sets of current action values 508, and asserts a corresponding action signal. The FPGA 410 also includes an action selector 506 which receives the asserted action signal. As shown in FIG. 5, the action to be taken may be one of an arm, disarm, trigger, collect, stop collect, or reload action. The action executor 512 controls the execution of the asserted action. If the action is an arm, disarm, trigger, collect or stop collect action, the action executor 512 accordingly allows or disallows target data to be collected in the state RAM 440. If the action is a reload action, the action executor 512 updates the current configuration structure address 514 to the next configuration structure address as indicated in the current configuration structure.

Figure 6:
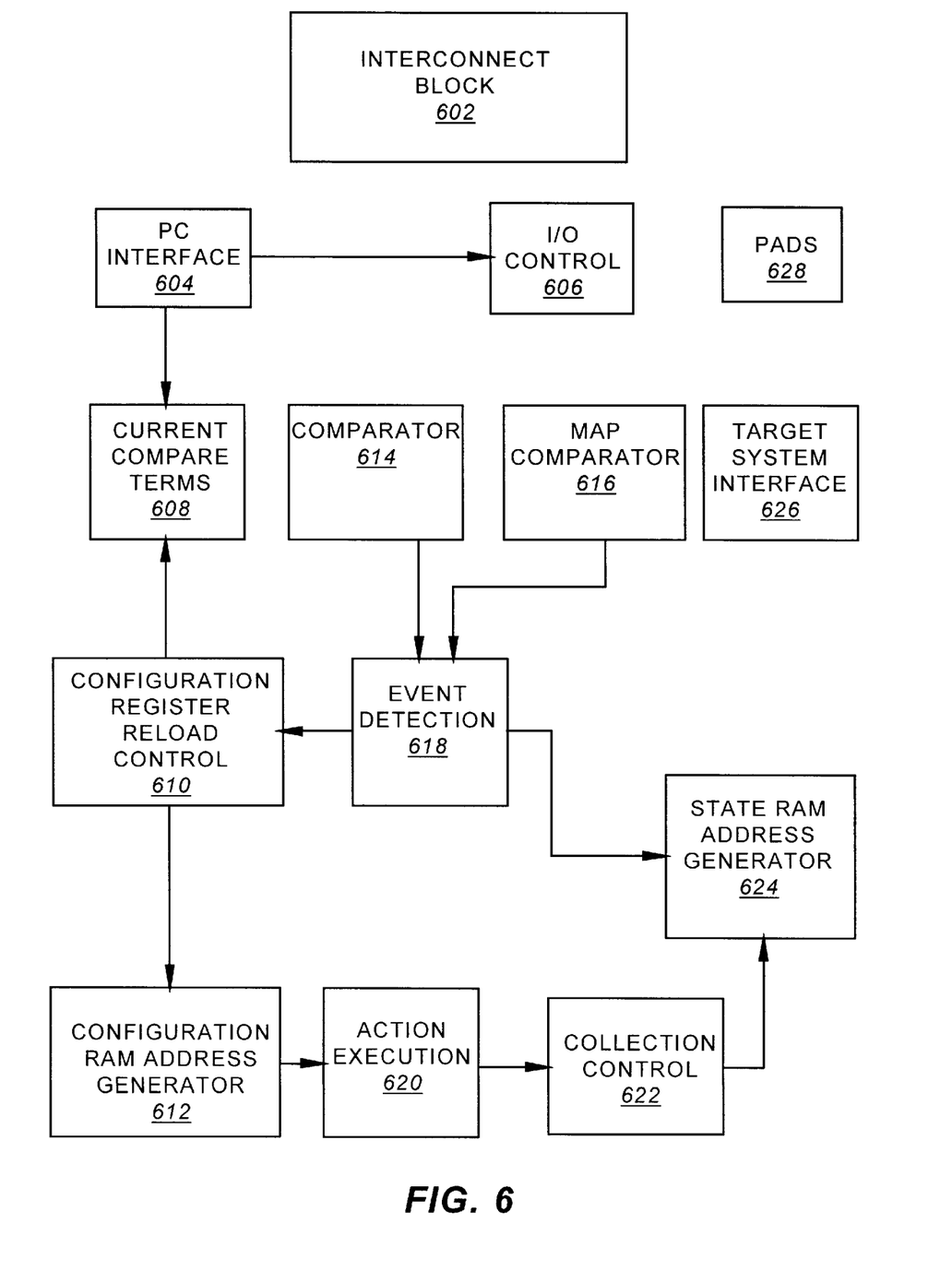
FIG. 6 is a block diagram showing the hierarchical structure of the code used to implement the FPGA in the preferred embodiment.

FIG. 6 is a block diagram showing the hierarchical structure of the code used to implement the FPGA in the preferred embodiment. In the preferred embodiment, the FPGA 410 is programmed using a hardware design language such as VHDL (VLSI Hardware Design Language) or Verilog, both of which are known in the art. As shown in FIG. 6, the functional logic of the FPGA 410 is partitioned into several VHDL program files. The functionality first includes a top level interconnect file 602. Pads 628 and connections to the internal blocks are specified at this level.

The user interface is implemented with a parallel computer (PC) interface file 604, which contains the logic functionality of the PC interface, and an input/output control file 606, which contains the read/write control logic for the I/O to the ISA card. The PC interface file 604 implements a set of analyzer setup registers that allow loading and unloading of the RAM arrays and which control recording and playback of states. The I/O control file 606 implements an eight bit parallel interface that easily connects to the PC ISA bus. Register bits are provided that reset the analyzer, allow recording, and permit step-by-step loading or writing to the configuration, state, and map RAM arrays. A register or RAM is accessed by a two-step process: a register select is sent to the PC interface control on the PC ISA bus via the I/O control that specifies which location, either one of several internal registers or a RAM location, is to read or written; then, on the next access, the location is read or written. In the preferred embodiment, all of the RAM arrays are read/write, the current action register, current compare values, current configuration structure address, and current state value are read only.

The next hierarchical level includes files for implementing the logical functionality of the FPGA 410. A current compare terms file 608 implements the registers used to hold the current compare terms. In the preferred embodiment, a port to the configuration RAM 420 is implemented from which compare terms can be loaded. The current compare term/associated action registers are reloadable in two clock cycles. During the first clock cycle, the first and second compare terms from the configuration RAM array 420 are loaded by a configuration register reload controller, implemented in a reload controller file 610, into the first and second compare term/associated action registers implemented in the current compare terms file 608 to hold the first and second compare terms. On the second clock cycle, the address is automatically incremented by a configuration RAM address generator, implemented in a configuration RAM address generator file 612, and compare terms from the configuration RAM 420 at the incremented address are loaded by the configuration register reload controller into the third and fourth compare term/associated action registers implemented in the current compare terms file 608 to hold the third and fourth compare terms. The configuration RAM address generator file 612 implements the logic required to generate the address for the current configuration structure in the configuration RAM 420. This logic includes a pointer to the current set of four compare terms, associated actions, and associated next configuration structure addresses. When a match event occurs, the configuration RAM address generator file 612 automatically retrieves the appropriate one of four actions to be executed next. If a reload action is requested, the configuration RAM address generator file 612 automatically retrieves the desired new configuration structure address and initiates the reload process.

A comparator file 614 implements the functionality of the compare term registers. The comparator file 614 implements a set of four compare term registers using four comparators, one for each compare term. In the preferred embodiment, the comparators can operate in one of four modes: (1) 16-bit compare; (2) 8-bit low byte compare with 8-bit mask; (3) 8-bit high byte compare with 8-bit mask; and (4) 8-bit middle byte compare with 8-bit mask. More sophisticated masking may be achieved by implementing a bit map wherein every possible n-bit input state value is mapped to a user programmed map value. The user programmed map values are stored in the map RAM 430 (as shown in FIG. 4). A map comparator file 616 implements the bit map control. The bit map allows a sophisticated comparison selection for every configuration. For example, if a comparison is desired only for every third 16-bit value, every third value can be mapped to a 4-bit code, and the map comparator can be specified to check for this code value. As another example, the map comparator may be specified to check for a certain range—thus a range of input state values (e.g., 301 to 812 and 124 to 129) can be mapped to a specific code, which makes it possible for the map comparator to initiate an action that will occur if either of these two ranges is detected. The logic for determining whether a match occurs is implemented in an event detection file 618.

An action execution file 620 implements the logic for executing an action when a match occurs. As described previously, the possible actions in the preferred embodiment are: arm, disarm, trigger, collect, stop collect, and reload. The possible actions in the preferred embodiment are not limiting; thus it is foreseen that additional actions may be implemented such as causing an external trigger or driving an interrupt line.

A state RAM address generator file 624 implements the logic required to maintain the current state RAM address counter. Each time a state is collected, the current state RAM address counter is incremented. When a trace is finished recording, the state RAM address counter may be reset, and the states of the trace may be retrieved one at a time by manually incrementing the counter via a register increment command issued via the user interface.

Although the matching method illustrated herein is shown as a basic comparator method, it is not intended to limit the scope of the invention to such methods. Any desired means for obtaining a match and for retrieving its associated action may be used in implementation. It will further be appreciated that many implementations may be employed to provide the functionality of the reload controller, and likewise, the functionality of the action selector, action controller, and state collection controller. The spirit of the invention lies in the ability of the reloading state analyzer to dynamically reload sequential trigger configurations (i.e., new compare terms and associated actions) according to, and at the time of, the actual incoming state data received.

Figure 7:
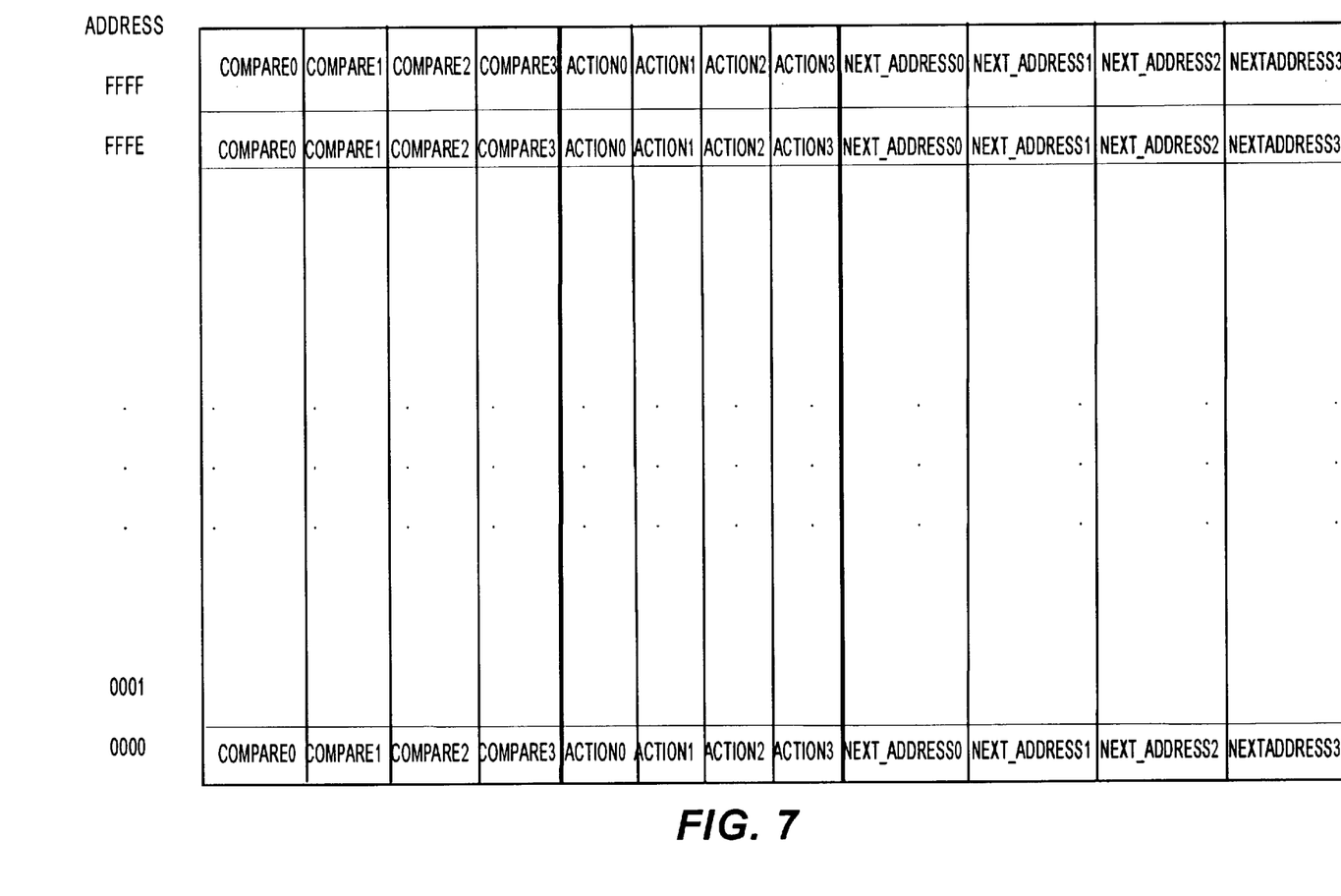
FIG. 7 is an example layout of a configuration structure used in the preferred embodiment reloading state analyzer of FIG. 5.

FIG. 7 is an example layout of a configuration structure used in the preferred embodiment reloading state analyzer of FIG. 5. As shown in FIG. 7, each configuration structure includes four compare terms COMPARE0–COMPARE3, four associated actions ACTION0–ACTION3, and four associated next configuration structure addresses NEXT_ADDRESS0–NEXT_ADDRESS3. The layout of the configuration structure may be designed in any suitable manner to conform to the hardware configuration of the reloading state analyzer. Accordingly, although the contents of each configuration structure as shown in FIG. 7 are contiguous, in practice the memory structure will be much more complex due to the tree structure of the trace configurations.

Figure 8:
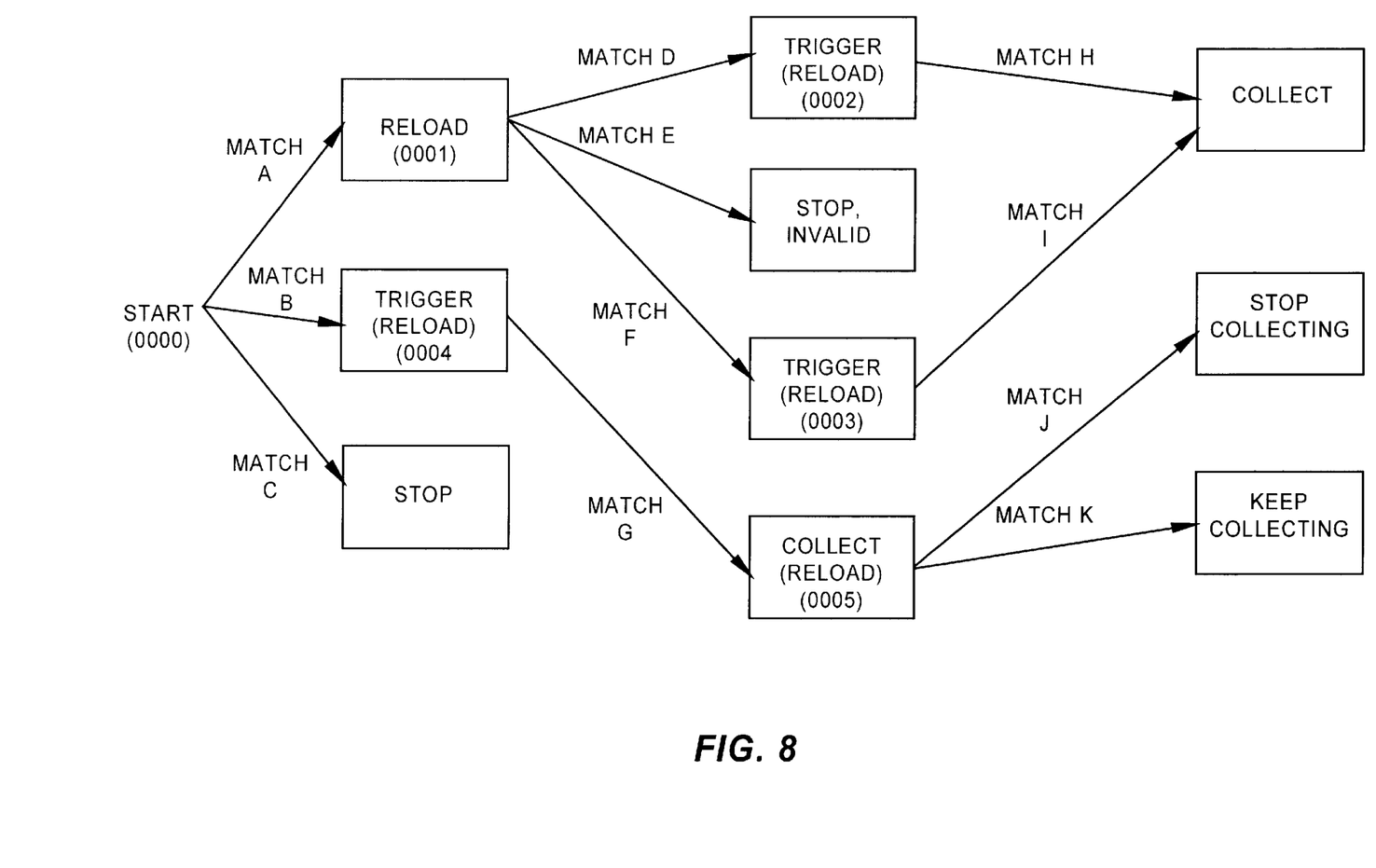
FIG. 8 is an example trigger sequence tree used to illustrate the operation of the present invention.
Figure 9:
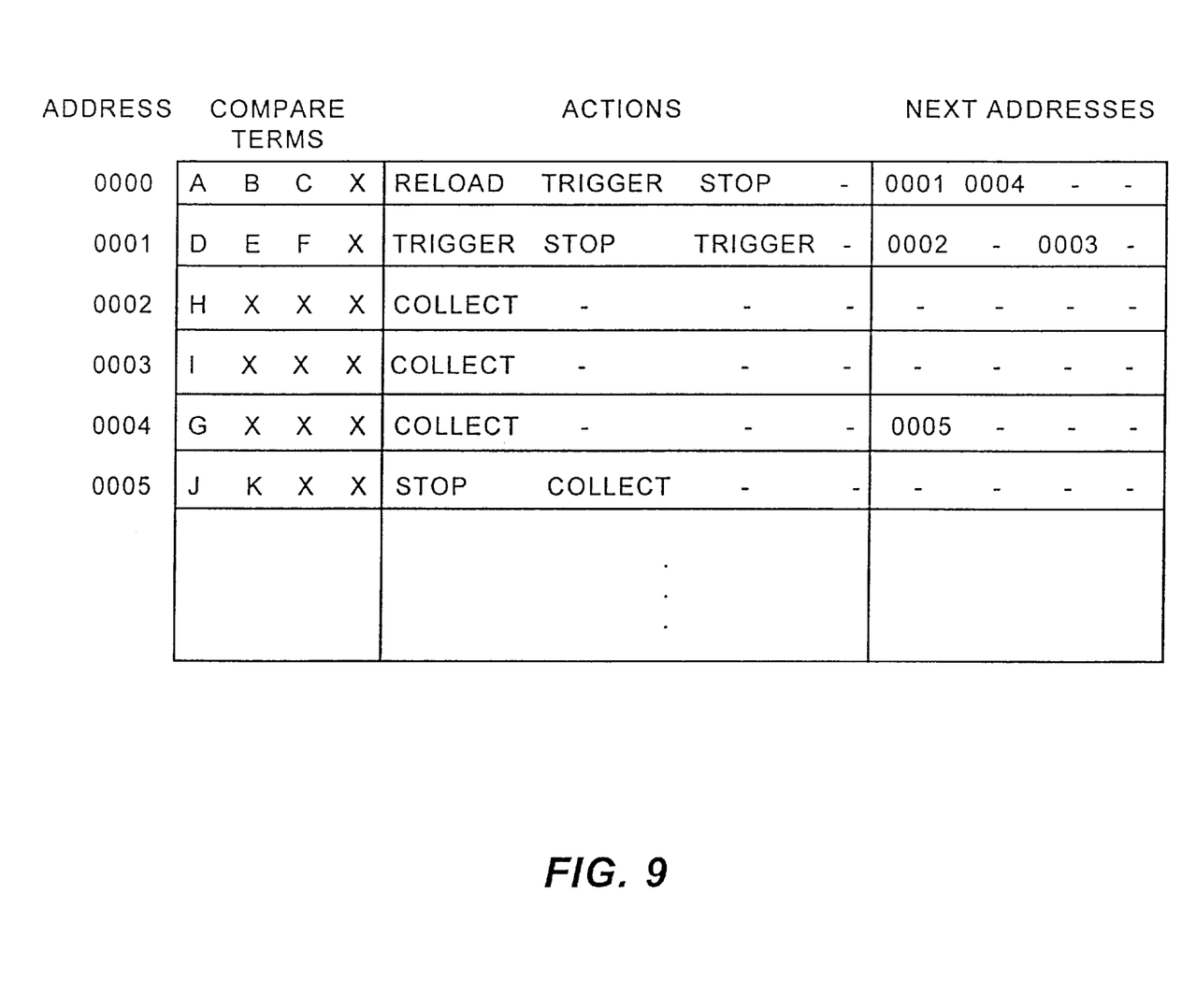
FIG. 9 is an example data file containing the configuration structures corresponding to the trigger sequence tree of FIG. 8.

FIG. 8 is an example trigger sequence tree included herein for illustration of the operation of the reloading state analyzer. FIG. 9 is an example data file containing the configuration structures corresponding to the trigger sequence tree of FIG. 8 which would be downloaded into the configuration RAM 420 before executing the trace. With reference to FIGS. 2, 8 and 9, the trigger sequence begins by loading the compare terms and associated actions from configuration RAM address 0000 into the compare term/associated action registers 20 and looking for a match A, B or C.

If a match on A occurs, the action selector 30 retrieves the associated action, RELOAD, from the current configuration structure at configuration RAM address 0000. Since it is a RELOAD action, the associated next configuration structure address 0001 is pointed to and the compare terms D, E and F from configuration RAM address 0001 are loaded into the compare term/associated action registers 20. The reloading state analyzer then looks for a match on D, E or F. If a match on D occurs, the action selector 30 retrieves the associated action, TRIGGER, from the current configuration structure at configuration RAM address 0001. The TRIGGER action causes the action controller 38 to signal the state collection controller 42 to permit collection of states. The associated next configuration structure address 0002 is then pointed to and the compare term H from configuration RAM address 0002 is loaded into the compare term/associated action registers 20. The reloading state analyzer then looks for a match on H. If a match on H occurs, the action selector 30 retrieves the associated action, COLLECT, from the current configuration structure at configuration RAM address 0002. The COLLECT action causes the action controller 38 to signal the state collection controller 42 to being collecting states. Since there is no associated next configuration structure address, the analyzer collects states until the state RAM 48 is filled. If instead a match at the previous level on E occurs, the action selector 30 retrieves the associated action, STOP, from the current configuration structure at configuration RAM address 0001. The STOP action causes the action controller 38 to stop the analyzer since this is an invalid state. Since there is no associated next configuration structure address, the analyzer collects states until the state RAM 48 is filled. If instead at the previous level a match on E occurs, the action selector 30 retrieves the associated action, TRIGGER, from the current configuration structure at configuration RAM address 0001. The TRIGGER action causes the action controller 38 to signal the state collection controller 42 to permit collection of states. The associated next configuration structure address 0003 is then pointed to and the compare term I from configuration RAM address 0003 is loaded into the compare term/associated action registers 20. The reloading state analyzer then looks for a match on I. If a match on I occurs, the action selector 30 retrieves the associated action, COLLECT, from the current configuration structure at configuration RAM address 0003. The COLLECT action causes the action controller 38 to signal the state collection controller 42 to being collecting states. Since there is no associated next configuration structure address, the analyzer collects states until the state RAM 48 is filled.

If instead a match on B occurs at the first level, the action selector 30 retrieves the associated action, TRIGGER, from the current configuration structure at configuration RAM address 0000. The TRIGGER action causes the action controller 38 to signal the state collection controller 42 to permit collection of states. The associated next configuration structure address 0004 is then pointed to and the compare term G from configuration RAM address 0004 is loaded into the compare term/associated action registers 20. The reloading state analyzer then looks for a match on G. If a match on G occurs, the action selector 30 retrieves the associated action, COLLECT, from the current configuration structure at configuration RAM address 0004. The COLLECT action causes the action controller 38 to signal the state collection controller 42 to being collecting states. The associated next configuration structure address 0005 is then pointed to and the compare terms J and K from configuration RAM address 0005 are loaded into the compare term/associated action registers 20. The reloading state analyzer then looks for a match on J or K. If a match on J occurs, the action selector 30 retrieves the associated action, STOP, from the current configuration structure at configuration RAM address 0005. The STOP action causes the action controller 38 to signal the state collection controller 42 to stop. If instead a match on K occurs, the action selector 30 retrieves the associated action, COLLECT, from the current configuration structure at configuration RAM address 0005. The COLLECT action causes the action controller 38 to signal the state collection controller 42 to being collecting states. Since there is no associated next configuration structure address, the analyzer collects states until the state RAM 48 is filled.

If instead a match on C occurs at the first level, execution stops and no new compare terms are loaded.

It is clear from the above description that the reloading state analyzer of the present invention revolutionizes the ability of a state analyzer to quickly and efficiently capture faulty states. The reloading state analyzer provides the ability to reload its configuration nearly instantaneously while monitoring and collecting states. The reloading state analyzer may proceed through a sequence of observed states in realtime, and reload the triggering sequence with a new configuration from a collection of available user programmed configurations. Thus, the user can specify a tree of possible tracking paths and actions that may occur. The reloading state analyzer traverses the tree in real time according to what states actually occur. Thus, the reloading state analyzer of the present invention is not restricted to one trigger sequence. Instead, it can store many possible sequences leading to many different outcomes. When a target system under test/development is run and its operation is captured by the reloading state analyzer, the reloading state analyzer will track the operation of the system, reload the triggering sequence configuration as necessary, and inform the user at the end of the analyzer state acquisition which outcome was reached and display the states that were collected along the way.

It will also be appreciated from the above discussion that the architecture of the preferred embodiment reloading state analyzer is such that the entire reloading state analyzer including state interface, parallel computer (PC) interface, match configuration, and comparators, is implemented on a single FPGA (Field Programmable Gate Array). Only the state and configuration RAMs are external, as well as the target system and PC interface buffers to protect the FPGA from ESD (Electrostatic damage).

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A reloading state analyzer comprising:
    an input interface for receiving input state data;
    a configuration memory for storing configuration structures comprising compare terms and associated actions;
    a comparator for comparing a plurality of current compare terms having associated actions with said input state data and indicating when a matching one of said plurality of current compare terms matches said input state data;
    an action executor for executing an associated action corresponding to said matching one of said current compare terms; and
    wherein a plurality of new compare terms and associated actions become said current compare terms and associated actions when said action is a reload action.

2. The reloading state analyzer of claim 1, further comprising:
    a state memory for storing input state data.

3. The reloading state analyzer of claim 2, further comprising a user interface for loading said configuration memory with configuration structures and for uploading contents of said state memory.

4. The reloading state analyzer of claim 3, wherein said user interface provides user access to an internal state of said reloading state analyzer, including access to contents of said comparator and control over said action executor.

5. The reloading state analyzer of claim 1, further comprising:
    a mapped mask memory for storing a plurality of bit-mapped masks, each of said plurality of bit-mapped masks being mapped to one or more input state data values such that when said comparator detects one of said input state data values as said input state data, said input state data is masked with its corresponding bit-mapped mask when determining whether a match occurs.

6. The reloading state analyzer of claim 1, wherein each of said configuration structures stored in said configuration memory also comprises next configuration structure addresses associated with each of said compare terms.

7. The reloading state analyzer of claim 6, said action executor comprising:
    a reload controller for keeping track of a current configuration structure comprising said current compare terms, associated actions, and associated next configuration structure addresses, and for setting a current configuration structure address to a next configuration structure address associated with said matching one of said plurality of current compare terms.

8. The reloading state analyzer of claim 1, wherein said associated action comprises one of:
    an arming action to enable triggering on an event which may occur sometime in the future;
    a trigger action which permits collection of states;
    a collect action which permits the collection of states if a trigger has occurred;
    a stop collect action which prohibits collection of states even if a trigger has occurred;
    a reload state action which replaces said current compare terms and associated actions with new compare terms and associated actions retrieved from said configuration; and
    a disarm action which disallows a trigger to occur even if a triggering event occurs sometime in the future.

9. The reloading state analyzer of claim 1, further comprising:
    a plurality of compare term registers for holding said current compare terms.

10. The reloading state analyzer of claim 9, further comprising:
    a plurality of action registers for holding said associated actions corresponding to said current compare terms.

11. The reloading state analyzer of claim 1, further comprising a user interface for loading said configuration memory with configuration structures.

12. A method for tracking a trigger sequence tree in a reloading state analyzer, said method comprising the steps of:
    (a) comparing a plurality of current compare terms having associated actions with input state data and indicating when a matching one of said plurality of current compare terms matches said input state data;
    (b) executing an associated action corresponding to said matching one of said current compare terms; and
    (c) replacing said current compare terms and associated actions with new compare terms and associated actions when said action is a reload action.

13. The method of claim 12, further comprising the step of:
    (d) storing input state data in a state memory when said action is a collect state action.

14. The method of claim 13, further comprising the step of:
    (e) uploading contents of said state memory.

15. The method of claim 12, step (a) further comprising the step of:

(a) (i) masking said input state data with a corresponding bit-mapped mask which is stored in a mapped mask memory when determining whether a match occurs.

16. The method of claim 12, wherein step (c) further comprises the steps of:
  (c) (i) keeping track of a current configuration structure comprising said current compare terms, associated actions, and associated next configuration structure addresses; and
  (c) (ii) setting a current configuration structure address to an associated next configuration structure address corresponding to said matching one of said plurality of current compare terms.

17. The method of claim 12, further comprising a step of:
  (d) loading said configuration memory with a sequential trigger tree comprising a plurality of configuration structures, each configuration structure comprising one or more compare terms and associated actions and associated next configuration structure addresses.

* * * * *